Figure 1:
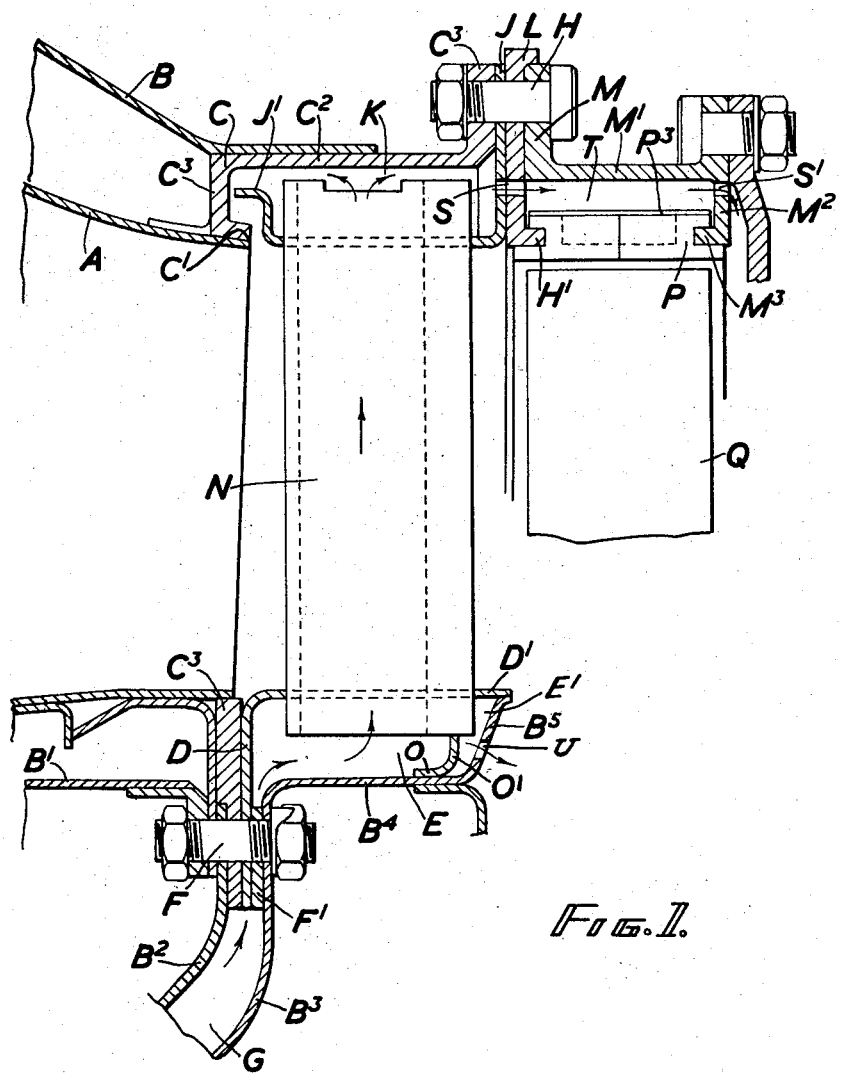

Nov. 11, 1958　　F. B. HALFORD ET AL　　2,859,934
GAS TURBINES

Filed July 16, 1954　　2 Sheets-Sheet 1

INVENTOR
ARNOLD R. B. GAY
FRANK B. HALFORD
ATTORNEYS

INVENTOR
ARNOLD R. B. GAY
FRANK B. HALFORD

2,859,934
Patented Nov. 11, 1958

United States Patent Office

2,859,934
GAS TURBINES

Frank Bernard Halford, Edgware, and Arnold Roydon Bennett Gay, Stanmore, England, assignors to The De Havilland Engine Company Limited, Leavesden, England, a British company Application July 16, 1954, Serial No. 443,942

Claims priority, application Great Britain July 29, 1953

8 Claims. (Cl. 253—39.1)

This invention relates to gas turbine units and in particular to the construction and arrangement of the parts of such units comprising the so-called nozzle ring, by which the working gases from the combustion chamber or chambers are directed on to an adjacent ring of blades forming part of the turbine rotor, and the adjacent part of the turbine stator or casing assembly.

An object of the invention is to provide a simple and effective arrangement permitting cooling of the so-called turbine shroud, that is to say the annular wall which immediately surrounds a turbine rotor blade ring and is itself surrounded by the adjacent part of the turbine stator casing, and of such adjacent part of the stator casing.

To this end an axial flow turbine according to the present invention includes a nozzle blade ring assembly comprising inner and outer annular supporting ring assemblies each including inner and outer circumferential walls enclosing between them an annular cooling-air chamber, the inner circumferential wall of the outer supporting ring assembly and the outer circumferential wall of the inner supporting ring assembly having apertures therein through which pass respectively the inner and outer ends of tubular guide blades or vanes constituting a ring of nozzle blades the passages through which thus communicate at their ends respectively with the two annular cooling-air chambers (hereinafter called the inner and outer nozzle ring cooling-air chambers), a rotor blade ring on to which the working fluid is directed by the nozzle blade ring, a turbine shroud immediately surrounding the rotor blade ring and itself surrounded by and spaced from the adjacent part of the turbine casing so as to form therewith an annular shroud cooling-air chamber which thus surrounds the shroud, means for delivering cooling air to the inner nozzle ring cooling-air chamber so that it flows through the tubular nozzle ring blades into the outer nozzle ring cooling-air chamber, and means for leading such cooling air from the outer nozzle ring cooling-air chamber into the annular cooling-air chamber surrounding the shroud and for permitting the air to escape from such annular shroud cooling-air chamber preferably into the gas stream leaving the rotor blade ring.

If desired a passage or passages may also be provided by which a proportion of the air delivered to the inner nozzle ring cooling-air chamber is permitted to escape therefrom into a chamber adjacent to the roots of the blades of the rotor blade ring in order to assist the cooling of such roots.

In any case the shroud is conveniently supported at its ends from the turbine casing in a manner permitting it to expand and contract freely relatively to such casing. Thus in one arrangement the shroud may comprise a series of segmental sections supported at their ends by annular axially extending flanges carried by the turbine casing in a manner permitting the sections to expand and contract circumferentially relatively to the flanges, the sections overlapping one another at their ends in the circumferential direction to allow for such circumferential expansion and contraction.

Alternatively the shroud might be formed as a one-piece ring and supported at its ends from internal flanges on the turbine casing through inter-engaging radial teeth formed respectively on the ends of the shroud and the inner edge portions of the flanges on the turbine casing.

Each of the tubular guide blades is conveniently located in the radial direction at one end while its other end is free to move relatively to its associated supporting ring assembly, and in one convenient arrangement the inner ends of the hollow guide blades bear against or are attached to an annular locating ring disposed within the inner nozzle ring cooling-air chamber while the outer ends of the tubular guide blades are free to move radially relatively to their annular supporting ring assembly.

Figure 2:
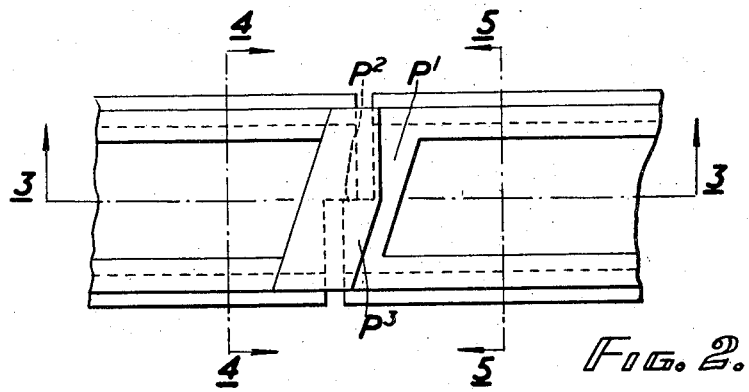
Figure 3:
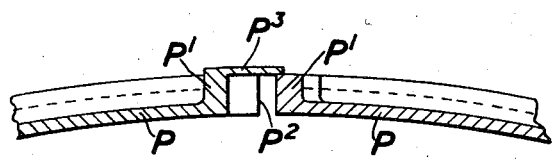
Figure 4:
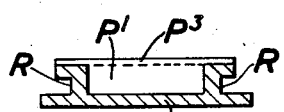
Figure 5:
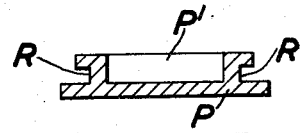
Figure 6:
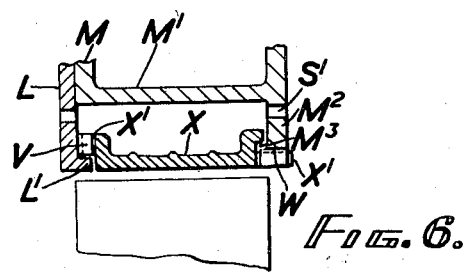

Two constructions according to the invention are illustrated somewhat diagrammatically by way of example in the accompanying drawings in which:

Figure 1 is a cross section through one circumferential part of the nozzle blade ring assembly, and the adjacent shroud and other parts of a turbine incorporating a form of the invention having a sub-divided shroud, the cross section being taken in a plane containing the axis of the nozzle ring and shroud, Figure 2 is a developed plan view of part of the shroud in the construction shown in Figure 1 showing how the ends of adjacent sections of the shroud overlap, Figure 3 is a cross section on the line 3—3 of Figure 2, Figure 4 is a cross section on the line 4—4 of Figure 2, Figure 5 is a cross section on the line 5—5 of Figure 2, and Figure 6 is a section in the same plane as Figure 1 of an alternative form and arrangement of shroud and its associated supporting parts which may be employed instead of that shown in Figures 1 to 5.

In the construction shown in Figures 1 to 5 the gas turbine to which the invention is shown as applied would comprise the usual compressor delivering air to the forward ends of a series of circumferentially displaced axially extending combustion chambers the rear end of one of which is shown at A, these combustion chambers being arranged in the usual manner with their ends supported respectively from the casing of the compressor or a diffuser associated therewith and from the nozzle blade ring assembly of a turbine which is itself connected by a suitable structure to the compressor or diffuser casing, as in the arrangement shown by walls indicated at B, and B1. Since the construction and arrangement of the compressor, diffuser and combustion chambers in itself forms no part of the invention and may be of normal well known type it will not be further described herein.

In the construction according to the invention shown in Figures 1 to 5 it will be seen that the rear ends of the walls B, and B1, are rigidly connected to the flanged end of a casing C having apertures therein with which the rear ends of the combustion chambers A communicate as shown at C1. This casing C comprises an outer circumferential wall C2 constituting the nozzle ring housing and having a deep inwardly directed flange C3 at its forward end in which the apertures C1 are formed. The inner edge of the flange C3 is secured not only to the wall B1 but also to a double-walled structure B2, B3 constituting part of the main inner rotor-supporting frame of the combustion turbine unit in a manner well known per se, and to a flanged ring D, D1 constituting the outer wall of an inner annular nozzle-blade-supporting ring, while the wall B3 has formed integral with it an axially extending flange like part B4 which is in the main radially spaced from the part D1 of the ring D, D1 but has an edge portion B5 which engages and is secured to the edge of the part D1 so that the flange B4 constitutes the inner wall of the inner annular nozzle-blade-supporting ring, and the ring D, D1 and the flanges B4, B5 enclose between them an annular chamber E. As shown the parts C3, B2, B3 and D are clamped together by bolts F, the parts B3 and D being spaced from one another however, by a series of circumferentially spaced distance pieces F1 between which passages are thus formed by which air can pass from the space G between the walls B2, B3 into the chamber E.

Means are provided in a manner well known in itself for delivering cooling air to the space G.

The rear end of the nozzle ring housing C2 is formed with a flange C4 to which is clamped by bolts H, a flange J on the rear end of a ring J1 which forms with the housing C2 an annular chamber K. Also clamped to the flange C4 by the bolts H is a ring L having a short axial flange H1 on its inner edge and a flange M on the front end of a ring M1 constituting the front end section of a turbine rotor housing which forms a part of the turbine casing. The ring L and the flange M2 form the end walls of a space T enclosing the turbine shrouds P as hereinafter described.

The part D1 of the ring D, D1 and the ring J1 have formed therein apertures the contours of which correspond respectively to the external cross sections of the end portions of tubular nozzle guide blades constituting the nozzle ring, one of these blades being shown at N in Figure 1 from which it will be seen that the blade is located radially by a flanged ring O surrounding and secured to the flange B4 and having an outwardly extending flange O1. The blades may either be arranged to bear against or be attached to the flange O1. Each blade N is a close but free fit within the apertures in the part D1 and ring J1 so that it is located but is free to expand and contract radially. It will also be seen that since the blades N are tubular the passages therethrough will communicate at their inner and outer ends respectively with the chambers E and K.

The part M1 is formed at its rear edge to provide an internal flange M2 having on its inner edge an axial flange M3 of the same general dimensions as the flange H1 on the ring L. Supported between the flanges H1 and M3 are a series of overlapping segments P together constituting a shroud for the adjacent blade ring of the turbine, shown at Q. Each segment of the shroud has slots R formed circumferentially in its sides into which fit the flanges H1 and M3 as shown so that the segments are supported by these flanges but are free to expand and contract circumferentially relatively thereto, the adjacent ends of the segments being formed as shown in Figures 2 to 5 so that they overlap and can slide circumferentially over one another while manitaining reasonably gas-tight engagement. Thus each end of each segment is provided with a rib P1 formed with a step P2 cooperating slidably with a similar step on the adjacent end of the adjacent segment, while the rib at one end of each segment is also provided with a flange-like part P3 which extends circumferentially and slides over the outer surface of the stepped rib P1 on the adjacent end of the adjacent segment.

Extending through the walls formed by the parts J, L and M2 are a series of apertures S, S1 constituting passages by which air can flow respectively from the chamber K into a chamber T formed between the shroud P and the rotor housing parts L, M1, M2, and out of the chamber T into the gas stream leaving the blade ring Q.

In operation cooling air is delivered continuously from a convenient point in the compressor to the chamber G from which it flows into the chamber E, thence through the tubular nozzle blades N into the chamber K and thence through the apertures S into the chamber T and thence out of this chamber through the apertures S1.

In addition apertures U are formed in the flange part B5 constituting passages by which air can flow from the chamber E into a chamber adjacent to the roots of the blades Q to assist in cooling such roots. The flange O1 on the ring O causes swirling of the air flow around the lower ends of the nozzle blades N.

If desired the blades N may be formed in known manner with passages of special contour known to improve the cooling of blades and/or with apertures therein by which part of the cooling air is permitted to escape therefrom, for example adjacent to their trailing edges to assist cooling but since such arrangements are known and in themselves form no part of the present invention they will not be herein further described or illustrated.

In the modification shown in Figure 6 the general construction might be otherwise as shown in Figures 1 to 5. In the construction shown in Figure 6, however, the ring L and the parts M, M1, M2 instead of being formed with flanges H1 and M3 are formed with radial dog teeth V and W and the shroud instead of being formed as a series of overlapping segments P, is formed as a one-piece ring X having radial dog teeth X1, X1 at its sides which engage the teeth V and W so that the shroud X is guided by the ring L and the part M2 in a manner allowing for its free radial expansion relatively thereto. In addition abutment surfaces constituting stops L1, M3 are provided to limit the inward position of the shroud ring X while maintaining it concentric with the ring L and thus in all circumstances ensure at least a predetermined minimum radial clearance between the rotor blade tips and the ring X.

What we claim as our invention and desire to secure by Letters Patent is:

1. An axial flow turbine having an enclosing turbine casing, and including a nozzle blade ring assembly comprising inner and outer annular supporting ring assemblies, each of said annular assemblies including inner and outer circumferential walls connected by annular end walls and enclosing between them an annular cooling air chamber, the inner circumferential wall of the outer supporting ring assembly and the outer circumferential wall of the inner supporting ring assembly having apertures therein, tubular guide blades or vanes having lengthwise passages therethrough constituting a ring of nozzle blades the inner and outer ends of which pass respectively through the outer circumferential wall of the inner supporting ring assembly and the inner circumferential wall of the outer supporting ring assembly, the passages through said guide blades or vanes communicating at their ends respectively with the inner and outer annular cooling-air chambers, said turbine also having a ring of rotor blades onto which the working fluid is directed by the ring of nozzle blades, a turbine shroud immediately surrounding the ring of rotor blades and spaced within and freely mounted for relative movement with respect to an adjacent part of the enclosing turbine casing between a plurality of annular end walls each of which is supported by said casing, and which end walls cooperate with the turbine casing and with the turbine shroud to form an annular shroud cooling-air chamber surrounding the shroud, means for delivering cooling air to the inner annular nozzle blade ring cooling-air chamber whence it flows through said tubular guide blades or vanes into the outer annular nozzle blade ring cooling-air chamber, at least one passage extending through an annular end wall between said outer annular nozzle blade ring cooling-air chamber and said annular shroud cooling-air chamber, at least one air escape vent extending through one of the end walls of said annular shroud cooling-air chamber permitting flow of air therefrom into the working gas stream leaving the blades of the rotor blade ring, and at least one escape passage extending through a wall of said inner nozzle blade ring cooling-air chamber adjacent to said rotor blade ring to divert a portion of the cooling air in the inner nozzle blade ring cooling-air chamber in the direction of the said rotor blade ring.

2. An axial flow turbine as claimed in claim 1 including slidably interengaging shroud-supporting means positioned between the sides of the shroud and the turbine casing and supported by the latter; said shroud-supporting means maintaining the shroud concentric with the turbine casing while permitting it to expand and contract freely relatively thereto.

3. An axial flow turbine as claimed in claim 1, in which the shroud is formed as a one-piece ring and guided at its sides by said end walls, said shroud and end walls having radial teeth formed on the sides of the shroud and the inner edge portions of said end walls.

4. An axial flow turbine as claimed in claim 3 in which the end walls include circumferentially extending stops on their sides which overlap the sides of the shroud ring and thereby limit the inward radial movement of the one-piece ring at all points in its circumference.

5. An axial flow turbine as claimed in claim 1 including an annular flanged ring disposed within the inner nozzle ring cooling air chamber, the inner ends of the tubular guide blades being in engagement with said ring.

6. An axial flow turbine as claimed in claim 5 in which the guide blades are free to move radially outwardly relatively to the circumferential walls of the supporting ring assemblies through which they pass.

7. An axial flow turbine as claimed in claim 1, in which the turbine shroud is composed of a series of segmental sections spaced apart and slidably overlapping at their ends.

8. An axial flow turbine as claimed in claim 7, in which the segmental sections of the shroud have radially spaced flanges on their sides and are supported at their sides by annular axially extending flanges carried by the turbine casing end walls slidably engaging between said spaced flanges on the sides of the sections, permitting the sections to expand and contract circumferentially relatively to the flanges while locating them radially.

References Cited in the file of this patent

UNITED STATES PATENTS

| | | |
|---|---|---|
| 2,584,899 | McLeod | Feb. 5, 1952 |
| 2,625,013 | Howard | Jan. 13, 1953 |
| 2,625,367 | Rainbow | Jan. 13, 1953 |
| 2,625,793 | Mierley | Jan. 20, 1953 |
| 2,651,492 | Feilden | Sept. 8, 1953 |
| 2,685,429 | Auyer | Aug. 3, 1954 |

FOREIGN PATENTS

| | | |
|---|---|---|
| 676,314 | Great Britain | July 23, 1952 |